A. P. ARMINGTON.
TRANSMISSION.
APPLICATION FILED MAY 21, 1920.
1,412,157.
Patented Apr. 11, 1922.
2 SHEETS—SHEET 1.
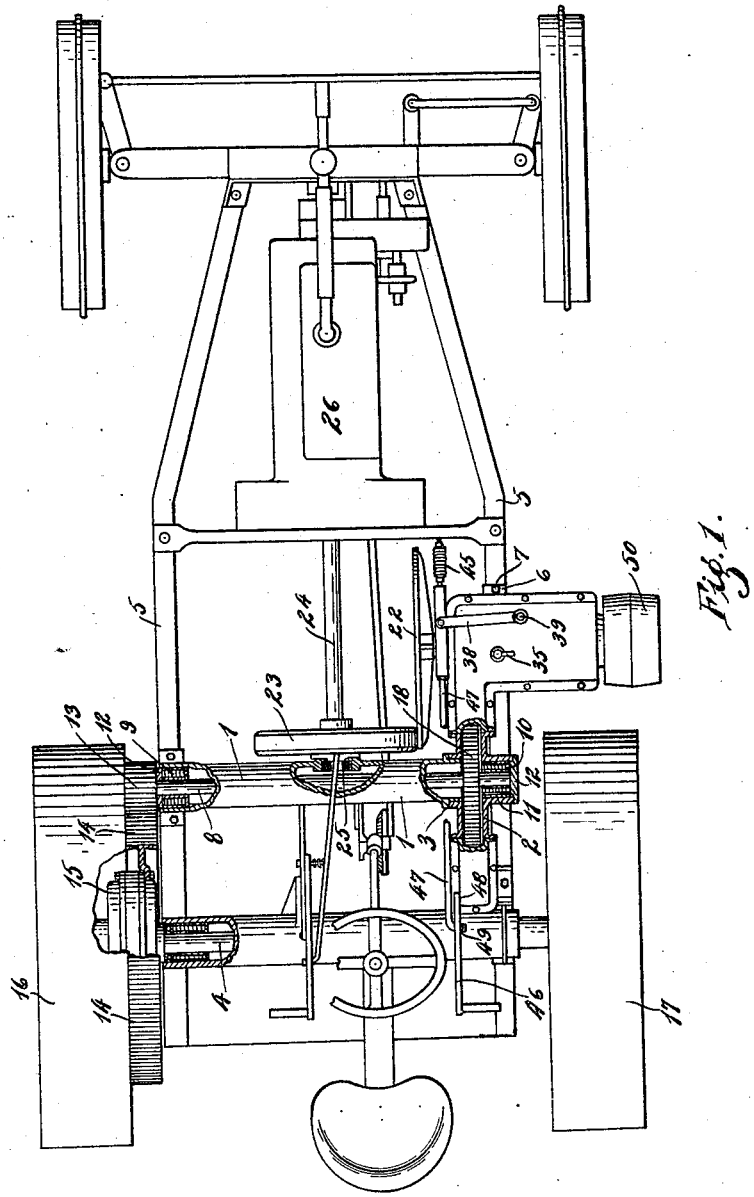
Inventor
Arthur P. Armington
By Hull, Smith, Brock & West.
Attys.

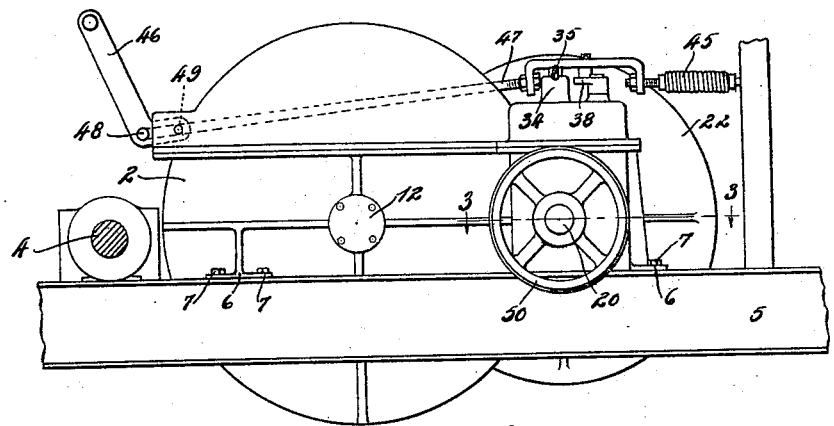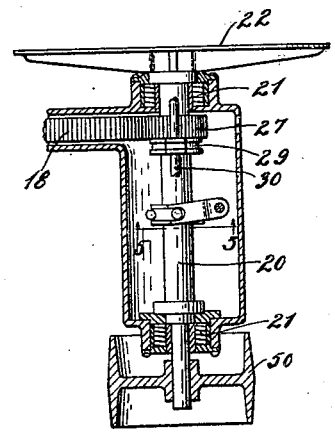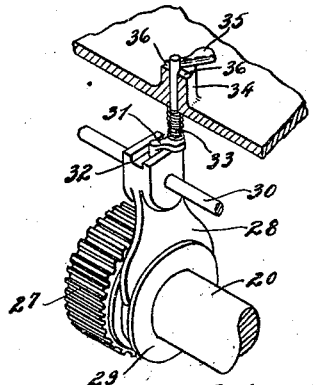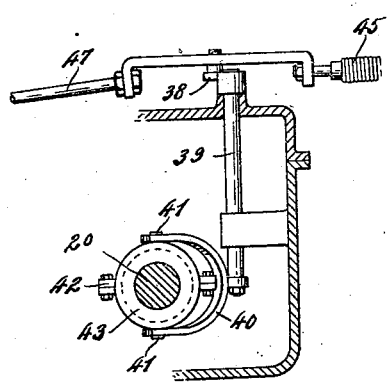

ns.

UNITED STATES PATENT OFFICE.

ARTHUR P. ARMINGTON, OF WICKLIFFE, OHIO.

TRANSMISSION.

1,412,157.  Specification of Letters Patent.  Patented Apr. 11, 1922.

Application filed May 21, 1920. Serial No. 383,102.

*To all whom it may concern:*

Be it known that I, ARTHUR P. ARMINGTON, a citizen of the United States, residing at Wickliffe, in the county of Lake and State of Ohio, have invented a certain new and useful Improvement in Transmissions, of which the following is a full, clear, and exact description, reference being had to the accompanying drawings.

This invention relates to transmissions and more particularly to unit transmissions such as are used in connection with self-propelled vehicles for transmitting the power from the source to the driving wheels.

Some of the objects of the present invention are to provide a unique self-contained transmission which is especially suitable for use on tractors and which can be attached to and detached from the vehicle frame as a unit; to provide a transmission which shall be simple in construction; inexpensive to manufacture; and particularly convenient of manipulation; while further objects and advantages will appear as the description proceeds. In the accompanying drawings, wherein I have shown an illustrative embodiment of my invention, Fig. 1 is a top plan view, with parts broken away, of my transmission applied to a tractor; Fig. 2 is an enlarged side elevation of my transmission and a portion of the tractor to which it is applied; Fig. 3 is a sectional view taken on the line 3—3 of Fig. 2; Fig. 4 is a perspective view of mechanism for disengaging the rear-wheel drive from the stationary-power drive; and Fig. 5 is a sectional view of the friction drive disengaging means taken on the line 5—5 of Fig. 3.

Describing by reference characters the parts shown in the accompanying drawings, 1 indicates a counter-shaft housing which is rigidly connected to a gear and clutch housing 2 at the point designated 3. The housing 1 is preferably disposed parallel with the rear axle 4 and the combined housings are detachably fastened to the tractor frame 5 by the flange projections 6 and the bolts 7. A counter-shaft 8 is rotatably supported within the housing 1 by the roller bearings 9 and 10, bearing 9 being fitted into the outer end of tubular housing 1 and the bearing 10 in the tubular projection 11 disposed on the housing 2 in axial alignment with the slip joint 3. Suitable cover plates 12, 12 serve to protect the bearings from foreign matter and retain the lubricant within the housings. A drive pinion 13 is fastened to one end of the shaft 8 and meshes with a large gear 14 which is operatively connected through a suitable differential mechanism 15 to the rear axle 4 to drive the rear wheels 16 and 17. The other end of shaft 7 is fitted with a gear 18 which is disposed within the housing 2.

A clutch shaft 20, (Fig. 3) is rotatably and slidably supported in roller bearings 21, 21 and is positioned parallel with the counter shaft 8 and rear axle 4. The inner end of shaft 20 has secured thereto, a friction disk 22 which is adapted to contact with a friction drive wheel 23 slidably mounted on the drive shaft 24 which is journalled, at one end, in a bearing 25 mounted in the tubular casing 1, and at the other end, said shaft is operatively connected to the engine 26. A pinion 27 is splined on shaft 20 and is movable into and out of mesh with gear 18 by means of a forked arm 28 engaging a grooved hub extension 29 of pinion 27. The arm 28 is reciprocable along a guide rod 30, which is disposed within the casing 2 in parallel relation to said shaft, by means of a lever 31 engaged at one end in the slotted head 32 of said arm and at its other end, said lever is fastened to a vertical shaft 33 which is journalled in a suitable boss 34 on the housing cover. An operating handle 35 is secured to the upper end of said shaft to facilitate rotation thereof and is engageable in either of the grooves 36, 36 to hold said gear in the engaged or disengaged position.

The shaft 20 and friction disk 22 are moved transversely to engage the friction wheel 23 by means of a lever 38 fastened to a vertical pivot shaft 39, which is journalled at its lower end in the housing 2 and at its upper end in the cover therefor. A forked arm 40 is mounted on the lower end of said pivot shaft and engages studs 41, 41 projecting from a split collar 42 mounted in a grooved collar 43 on shaft 20. A spring 45 connected between the lever 38 and the frame of the machine, tends to hold the disk 22 into engagement with the friction wheel 23 and disengagement of said disk is accomplished from the operator's seat by means of a pivoted handle 46 and a link connection 47 to the lever 38. It will be observed that by swinging the handle 46 rearwardly to its maximum position, as shown in Fig. 2, the pivotal point 48 of the link connection 47 will describe an arc and be positioned below the pivotal point 49 of the handle, thereby to retain the parts in inoperative position.

In operation, the handle 35 is rotated to engage pinion 27 with gear 18 and the handle 46 thrown forward to engage friction disk 22 with drive wheel 23 thereby to operatively connect the engine with the rear wheels to drive the tractor.

If it is desired to use the tractor as a stationary power plant, handle 46 is thrown rearwardly to disengage the friction drive and handle 35 is then rotated 180° to disengage pinion 27 from gear 18 thereby disconnecting clutch shaft 20 from the tractor drive. Engagement of the friction drive will now cause free rotation of the shaft 20 and power may be taken from said shaft by means of a pulley 50 fastened to the outer extremity thereof.

Having thus described my invention, what I claim is:—

1. The combination with a main frame, of a casing detachably mounted on said frame, said casing being composed of two interfitting members, one disposed at right angles to the other, a shaft journaled in each of said members, said shafts being arranged in parallel relation, one of said shafts having a friction disk upon one end and a pulley upon the opposite end and a pinion intermediate said disk and pulley, a gear mounted upon the other of said shafts and meshing with said pinion, and means for disengaging said pinion from said gear.

2. In an apparatus of the character set forth, the combination with a main frame having a source of power mounted thereon, of a casing mounted on said frame, a shaft journaled in said casing and operatively connected to the rear axle of said vehicle, a second shaft journaled in said casing and operatively connected to said first mentioned shaft, a power shaft having one end journaled in said casing and the other end connected to said source of power, a friction drive wheel carried by said power shaft, a friction disk fastened to an end of said second shaft and adapted to engage said friction drive wheel, and means for sliding said second shaft to engage and disengage said friction disk with said drive wheel.

3. In a vehicle of the character set forth, the combination with a main frame, of a unit transmission assembly detachably connected thereto, said assembly including a casing composed of two interfitting members, one disposed at right angles to the other and one of said members being disposed parallel to the rear axle of said vehicle, a shaft journaled in each of said members, a source of power carried by the said frame, a drive shaft having one end connected to said source of power and the other end journaled in said casing, and driving connections between said drive shaft and said rear axle including the shafts journaled in said casing.

4. In a vehicle of the character set forth, the combination with a main frame, of a unit transmission assembly detachably connected thereto, said assembly including a casing composed of two interfitting members, one disposed at right angles to the other and one of said members being disposed parallel to the rear axle of said vehicle, a shaft journaled in each of said members, said shafts being arranged parallel to the rear axle of said vehicle, a gear carried by one of said shafts, a pinion slidably mounted on the other of said shafts and adapted to engage with said gear, a guide rod disposed within said casing and arranged parallel with said shafts, a yoke slidably supported on said guide rod and engaged with said pinion, a rod projecting from said casing adjacent said yoke, a lever connected to the inner end of said rod and engaged with said yoke, and a lever connected to the outer end of said rod.

In testimony whereof, I hereunto affix my signature.

ARTHUR P. ARMINGTON.